(12) United States Patent
Hwang et al.

(10) Patent No.: US 9,178,389 B2
(45) Date of Patent: Nov. 3, 2015

(54) WIRELESS POWER TRANSMISSION SYSTEM AND METHOD OF CONTROLLING THE SAME

(75) Inventors: Sang Hoon Hwang, Seoul (KR); Kyung Joon Han, Seoul (KR); Tah Joon Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 420 days.

(21) Appl. No.: 13/569,098

(22) Filed: Aug. 7, 2012

(65) Prior Publication Data

US 2013/0050889 A1 Feb. 28, 2013

(30) Foreign Application Priority Data

Aug. 29, 2011 (KR) .................. 10-2011-0086528

(51) Int. Cl.
*H02J 7/00* (2006.01)
*H02J 17/00* (2006.01)

(52) U.S. Cl.
CPC . *H02J 17/00* (2013.01); *Y02B 60/50* (2013.01)

(58) Field of Classification Search
CPC ......... H02J 7/025; H02J 7/0052; H02J 17/00; H02J 7/047; H02J 7/0042; H01M 10/441; H01M 10/443
USPC ................................................ 320/108, 152
See application file for complete search history.

(56) References Cited

U.S. PATENT DOCUMENTS

| | | | | |
|---|---|---|---|---|
| 5,596,261 A | * | 1/1997 | Suyama .................. | 320/152 |
| 2008/0211455 A1 | * | 9/2008 | Park et al. .................. | 320/108 |
| 2009/0033280 A1 | * | 2/2009 | Choi et al. .................. | 320/108 |
| 2009/0140691 A1 | * | 6/2009 | Jung ........................... | 320/108 |
| 2010/0085020 A1 | * | 4/2010 | Suzuki et al. .............. | 320/157 |
| 2010/0156343 A1 | * | 6/2010 | Jung ........................... | 320/108 |
| 2011/0012556 A1 | * | 1/2011 | Lai .............................. | 320/108 |
| 2011/0050165 A1 | * | 3/2011 | Sato et al. .................. | 320/108 |
| 2011/0057606 A1 | * | 3/2011 | Saunamaki ................ | 320/108 |
| 2011/0109263 A1 | * | 5/2011 | Sakoda et al. ............. | 320/108 |
| 2011/0163713 A1 | * | 7/2011 | Wang et al. ................ | 320/108 |
| 2011/0187320 A1 | * | 8/2011 | Murayama ................. | 320/108 |

FOREIGN PATENT DOCUMENTS

| | | |
|---|---|---|
| JP | 2010-154625 A | 7/2010 |
| JP | 2011-120443 A | 6/2011 |
| KR | 10-2010-0101470 A | 9/2010 |
| KR | 10-1035334 B1 | 5/2011 |
| KR | 10-2011-0073732 A | 6/2011 |

OTHER PUBLICATIONS

KR 10-2011-0086528 Office Action dated Sep. 1, 2014; 6pgs.
KR10-2011-0086528 Office Action dated Mar. 10, 2015; 7 pgs.

* cited by examiner

*Primary Examiner* — Brian Ngo
(74) *Attorney, Agent, or Firm* — NSIP Law

(57) ABSTRACT

Disclosed herein is a wireless power transmission system, including: a transmission unit generating and transmitting power for charging a battery; a reception unit receiving the transmitted power and charging the battery with power; and a transmission control unit detecting a charging status of the battery by using the transmitted power, and, if the charging status of the battery is in a damage section due to reflective power, controlling the transmission unit to transmit power lower than power of a normal operation, whereby damage of transmission and reception devices due to a reflective wave can be minimized.

12 Claims, 3 Drawing Sheets

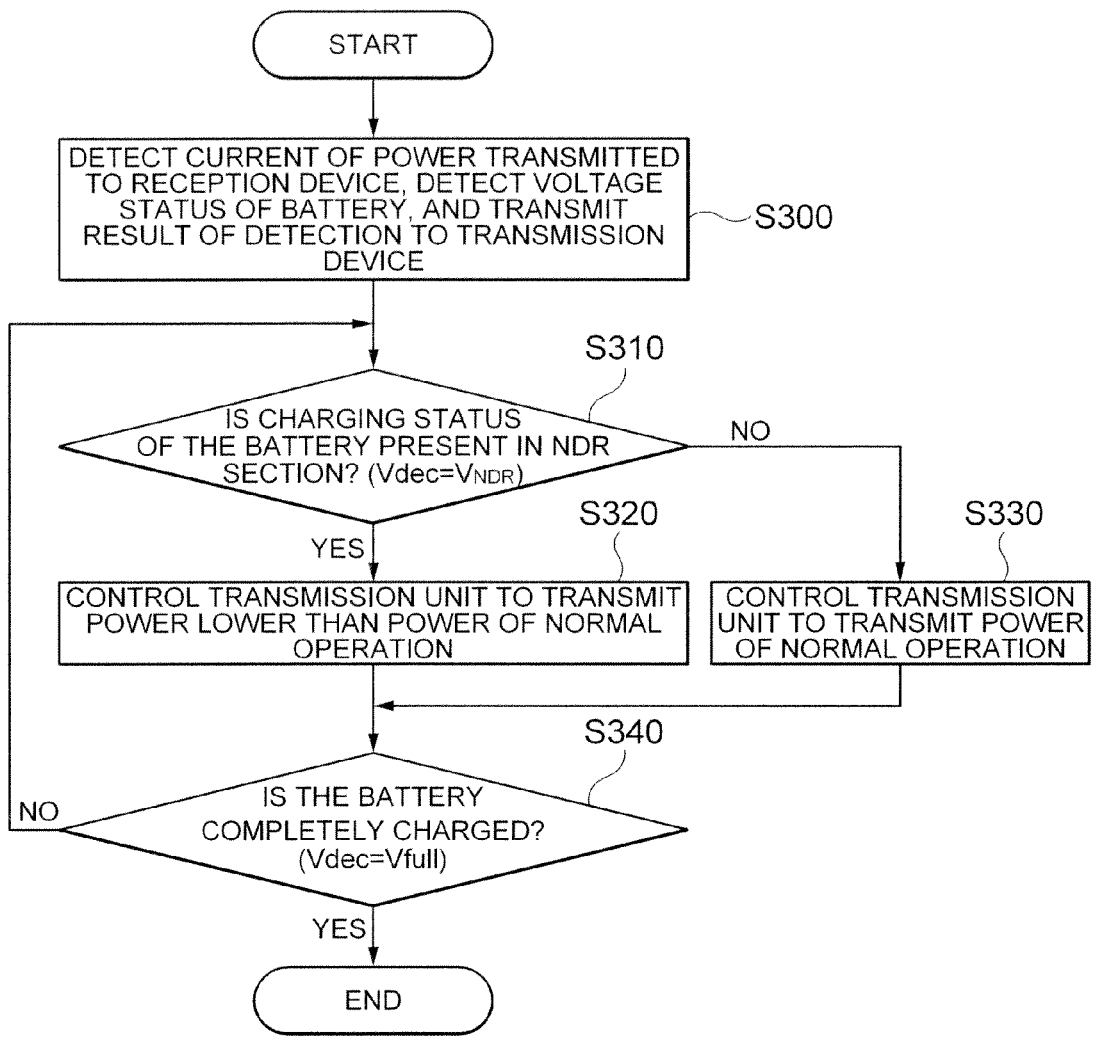

WIRELESS POWER TRANSMISSION SYSTEM AND METHOD OF CONTROLLING THE SAME

CROSS REFERENCE(S) TO RELATED APPLICATIONS

This application claims the benefit under 35 U.S.C. Section 119 of Korean Patent Application Serial No. 10-2011-0086528, entitled "Wireless Power Transmission System and Method of Controlling the Same" filed on Aug. 29, 2011, which is hereby incorporated by reference in its entirety into this application.

BACKGROUND OF THE INVENTION

1. Technical Field

The present invention relates to a wireless power transmission system that wirelessly charges a battery for driving an electronic device, and a method of controlling the wireless power transmission system, and more particularly, to a wireless power transmission system capable of minimizing damage due to a reflective wave generated when a battery is charged, and a method of controlling the wireless power transmission system.

2. Description of the Related Art

A variety of portable electronic products has been recently launched and distribution thereof has been remarkably increasing along with development of IT technology. Such portable electronic products are used while users are moving, and thus the performance of batteries is important.

Charging devices for charging batteries of portable electronic products with electricity supply power to battery packs using a terminal supply method.

However, in a case where charging devices and batteries are connected to or disconnected from each other, since terminals of charging devices and batteries have different electric potentials, discharging phenomenon may instantly occur in terminals. Further, impurities may be collected in terminals of charging devices and batteries over time, which causes fire or reduction in life and deterioration of performance of charging devices and batteries.

A wireless power transmission system has been proposed to solve the problem of the terminal supply method. In the wireless power transmission system, a transmission device generates electric energy and transmits the electric energy wirelessly, and a reception device receives the electric energy wirelessly and charges a battery with the electric energy. To achieve stability of the battery and efficiency of the wireless power transmission system, the battery is quickly charged with constant current until a charging voltage of the battery reaches a previously set voltage in a constant current (CC) mode, and the battery is charged with low current while maintaining the charging voltage of the battery constant if the charging voltage of the battery reaches the previously set voltage in a constant voltage (CV) mode.

However, the conventional wireless power transmission system has a problem in that the electric energy transmitted by the transmission device is partially received in the reception device and is charged in the battery in a section (a first section) in which the CC mode is changed into the CV mode, and the remaining electric energy acts as a reflective wave and damages the transmission and reception devices.

Furthermore, the above-described problem also takes place in a physical discharging section (a second section) in which the voltage charged in the battery is completely discharged since portable electronic products are not used for a long time or in an initial charging section (a third section) in which the battery is electrically cut-off discharged. In this regard, the first, second, and third sections are united and referred to as an NDR section.

SUMMARY OF THE INVENTION

An object of the present invention is to provide a wireless power transmission system that determines whether a charging status of a battery is present in an NDR section when the battery is charged, and, if the charging status of the battery is present in the NDR section, controls a transmission device to transmit power lower than power of a normal operation, and a method of controlling the wireless power transmission system.

According to an exemplary embodiment of the present invention, there is provided a wireless power transmission system, including: a transmission unit generating and transmitting power for charging a battery; a reception unit receiving the transmitted power and charging the battery with power; and a transmission control unit detecting a charging status of the battery by using the transmitted power, and, if the charging status of the battery is in a damage section due to reflective power, controlling the transmission unit to transmit power lower than power of a normal operation.

The transmission control unit may detect a charging voltage of the battery by using the transmitted power, and, if the charging voltage of the battery corresponds to a voltage range of the damage section due to the reflective power, control the transmission unit to transmit power lower than the power of the normal operation.

The wireless power transmission system may further include: a first detection unit detecting current by using the transmitted power; a second detection unit detecting a voltage status of the battery; a reception control unit combining the current detected by the first detection unit and the voltage status of the battery detected by the second detection unit and generating code information; and a reception communication unit transmitting the code information generated by the reception control unit to the transmission control unit.

The transmission control unit may determine a range of the transmitted code information, and, if the range of the transmitted code information is in the damage section due to the reflective power, control the transmission unit to transmit power lower than the power of the normal operation.

The damage section due to the reflective power may be a section in which a constant current (CC) mode in which the battery is charged with constant current is converted into a constant voltage (CV) mode in which the battery is charged with constant voltage.

The damage section due to the reflective power may be a section in which the voltage charged in the battery is completely discharged.

The damage section due to the reflective power may be an initial charging section of the battery.

The transmission unit may include: a power generator generating and transmitting the power for charging the battery; and a transmitter transmitting the transmitted power to the reception unit.

The transmission control unit may control the transmission unit to transmit the power of the normal operation if the charging status of the battery is not in the damage section due to the reflective power.

According to another exemplary embodiment of the present invention, there is provided a method of controlling a wireless power transmission system, the method including: generating and transmitting power for charging a battery;

receiving the transmitted power and charging the battery with power; detecting a charging status of the battery by using the transmitted power; if the charging status of the battery is in a damage section due to reflective power, controlling power lower than power of a normal operation to be transmitted.

The detecting and the controlling may be repeatedly performed until the battery is completely charged.

The detecting may include: detecting a charging voltage of the battery by using the transmitted power, wherein the controlling may include: if the charging voltage of the battery corresponds to the voltage range of the damage section due to the reflective power, controlling power lower than the power of the normal operation to be transmitted.

The detecting may include: detecting current by using the transmitted power; detecting a voltage status of the battery; combining the detected current and the detected voltage status of the battery, generating code information, and detecting the charging status of the battery.

The damage section due to the reflective power may be a section in which a CC mode in which the battery is charged with constant current is converted into a CV mode in which the battery is charged with constant voltage, a section in which the voltage charged in the battery is completely discharged, and an initial charging section of the battery.

The controlling may include: controlling the power of the normal operation to be transmitted if the charging status of the battery is not in the damage section due to the reflective power.

BRIEF DESCRIPTION OF THE DRAWINGS

FIG. 2 is a graph of a charging profile of a battery, in which FIG. 3 is a flowchart of a method of controlling a wireless power transmission system according to an exemplary embodiment of the present invention.

DESCRIPTION OF THE PREFERRED EMBODIMENTS

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Hereinafter, the exemplary embodiment of the present invention will be described in detail with reference to the accompanying drawings.

Figure 1:
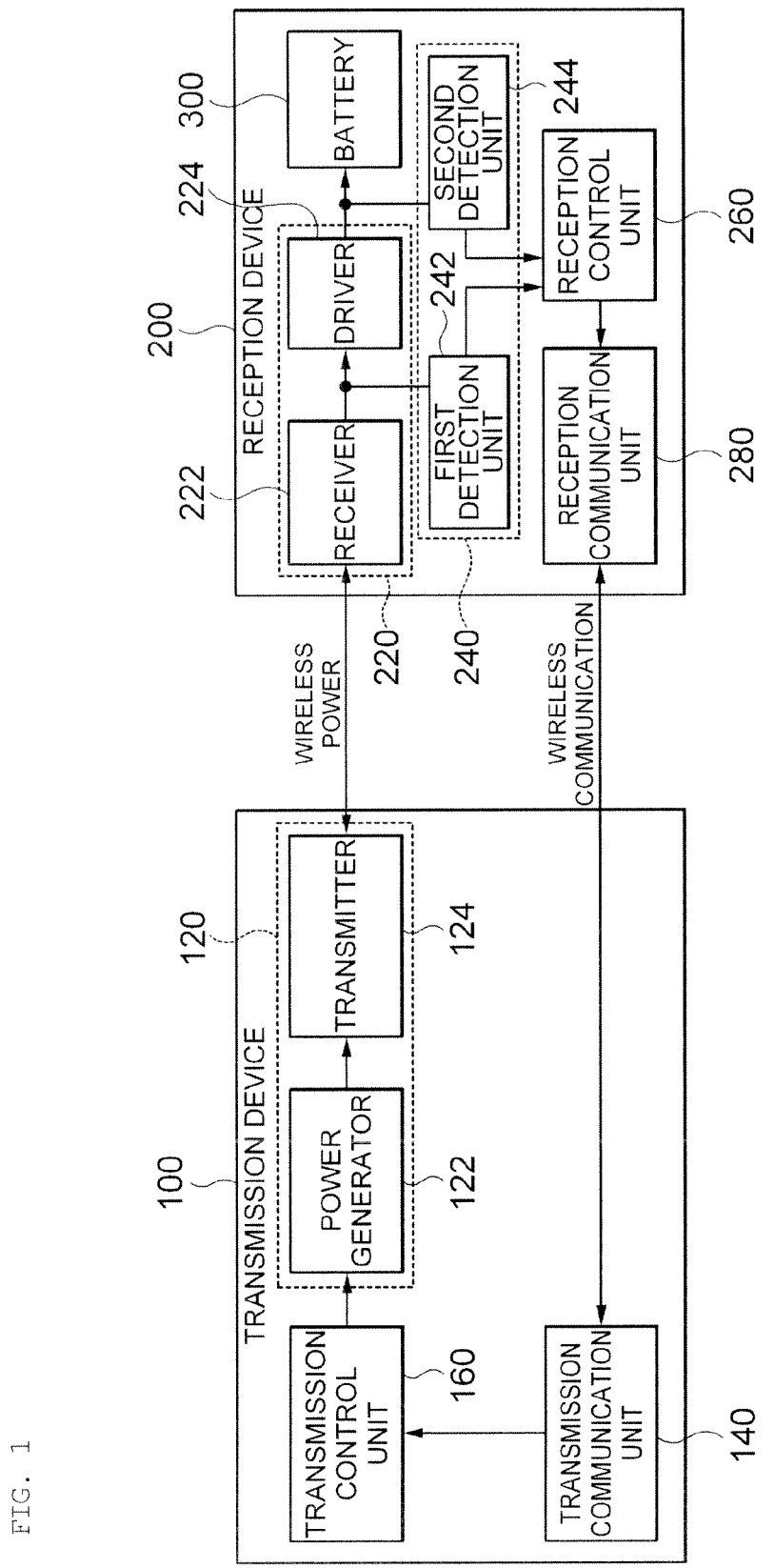
FIG. 1 is a block diagram showing a wireless power transmission system according to an exemplary embodiment of the present invention.

FIG. 1 is a block diagram showing a wireless power transmission system according to an exemplary embodiment of the present invention.

Referring to FIG. 1, a wireless power transmission system includes a transmission device 100 that generates power for charging a battery 300 and transmits the power to a reception device 200, and the reception device 200 that receives the power transmitted from the transmission device 100 and charges the battery 300 with the power.

The transmission device 100 includes a transmission unit 120, a transmission communication unit 140, and a transmission control unit 160.

The transmission unit 120 used to generate and transmit the power for charging the battery 300 includes a power generator 122 and a transmitter 124.

The power generator 122 may generate and output power having a high frequency of about several tens of kHz to about several tens of MHz.

The transmitter 124 used to wirelessly transmit the power generated by the power generator 122 to the reception device 200 may use one of a magnetic induction method using a magnetic field, a magnetic resonance method using an energy converted between the magnetic field and an electric field, and a microwave receiving method using microwave.

In this regard, the magnetic induction method is technology of using a magnetic energy coupling coefficient by using a primary coil as the transmitter 124 and a secondary coil as a receiver 222. Although the magnetic induction method is highly approaching to commercialization owing to its excellent high power and efficiency, the magnetic induction method has disadvantageously a short distance less than 0.5 cm and a rapid change in efficiency due to an arrangement of the primary and secondary coils.

Further, the magnetic resonance method that is similar to the magnetic induction method in that the magnetic field is used uses a coil type inductor L and a capacitor C as the transmitter 124 to focus energy at a specific resonance frequency by the transmitter 124. If the transmitter 124 transmits power as magnetic energy to the reception device 200, the reception device 200 having the same resonance frequency shows a tuning phenomenon and receives the transmitted magnetic energy. The magnetic resonance method advantageously may transmit relatively high energy to several meters.

The microwave receiving method radiates microwave into air via an antenna, thereby advantageously transmitting power to a far distance compared to the other methods, whereas the microwave receiving method causes great radiation loss in the air, which disadvantageously restricts efficiency in the received low power.

As described above, if the wireless power transmission system 1 adopts the magnetic induction method using the magnetic field, the transmitter 124 may include a magnetic induction coil, and, if the wireless power transmission system 1 adopts the magnetic resonance method, the transmitter 124 may include a magnetic resonance coil. Also, if the wireless power transmission system 1 adopts the microwave receiving method, the transmitter 124 may include an antenna.

The transmission communication unit 140 use to wirelessly transmit and receive data between the reception device 200 and a reception communication unit 280 may wirelessly transmit and receive data by using various communication methods.

The transmission control unit 160 that is a micom for generally controlling the transmission device 100 controls an operation of the transmission unit 120 based on the data transmitted by the transmission communication unit 140. In this regard, operational processes of the transmission communication unit 140 and the transmission control unit 160 will be described in more detail with reference to FIG. 2.

Meanwhile, the reception device 200 includes a reception unit 220, a detection unit 240, a reception control unit 260, and the reception communication unit 280.

The reception unit 220 used to receive the transmitted by the transmission unit 120 and charge the battery 300 with the power includes a receiver 222 and a driver 224.

The receiver 222, as described above, may include the magnetic induction coil if the wireless power transmission system 1 adopts the magnetic induction method using the magnetic field, and include the magnetic resonance coil if the wireless power transmission system 1 adopts the magnetic resonance method. Also, if the wireless power transmission system 1 adopts the microwave receiving method, the receiver 222 may include the antenna.

The receiver 222 may further include a rectifier performing a rectification operation in addition to the magnetic induction coil and the magnetic resonance coil.

The driver 224 may be configured to directly transmit the power received by the receiver 222 to the battery 300 or convert a level of the power to transmit the converted power to the battery 300.

Figure 2A:
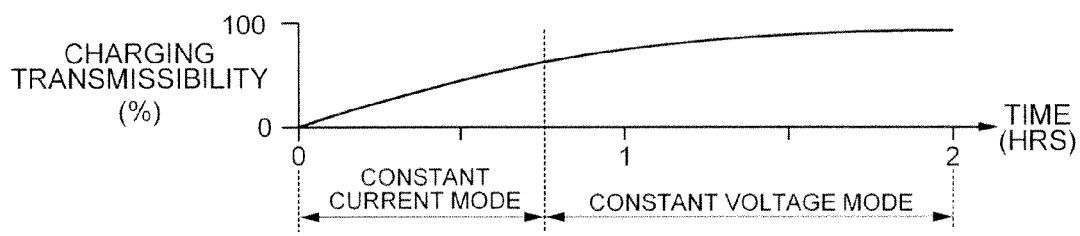
FIG. 2A is a graph of a charging transmissibility of the battery with respect to time.
Figure 2B:
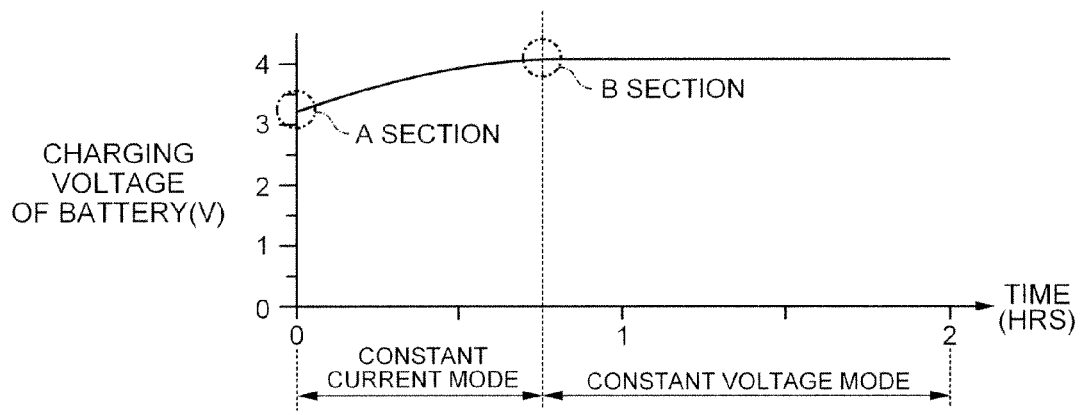
FIG. 2B is a graph of a charging voltage of the battery with respect to time.
Figure 2C:
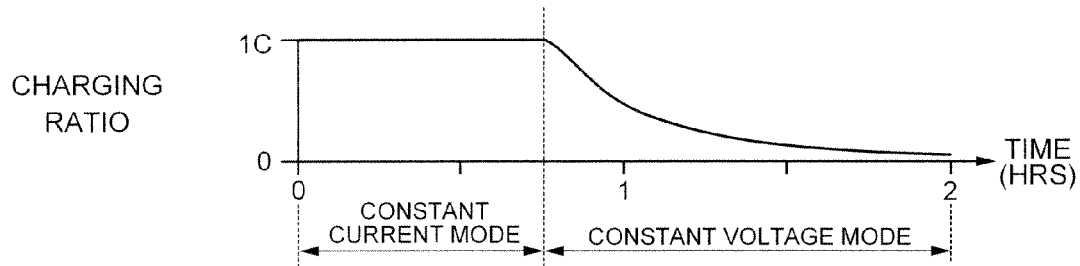
FIG. 2C is a graph of a charging ratio of the battery with respect to time.

FIG. 2 is a graph of a charging profile of a battery, in which FIG. 2A is a graph of a charging transmissibility of the battery with respect to time, FIG. 2B is a graph of a charging voltage of the battery with respect to time, and FIG. 2C is a graph of a charging ratio of the battery with respect to time.

Referring to FIGS. 2A and 2B, in the charging profile of the battery, in a constant current (CC) mode, the charging transmissibility of the battery increases, and the charging voltage thereof increases fast. Since constant current is continuously supplied to the battery, referring to FIG. 2C, the charging ratio of the battery maintains a constant value.

However, in a constant voltage (CV) mode, referring to FIGS. 2A and 2B, the charging transmissibility of the battery increases slowly, and the charging voltage thereof does not increase and remains constant. Since the current supplied to the battery is gradually reduced, referring to FIG. 2C, the charging ratio of the battery is rapidly reduced.

In this regard, in an initial charging section in which the battery is electrically cut-off discharged such as a section A, i.e. in which an inner protection circuit of a battery pack electrically blocks the battery from being completely discharged and thus the battery is powered off, and in a section in which the CC mode is changed to the CV mode such as a section B, electric energy transmitted by the transmission device 100 is partially received in the reception device 200 and is charged in the battery, and the remaining electric energy acts as a reflective wave, which problematically causes damage of the transmission and reception devices 100 and 200. Further, the above-described problem also takes place in a physical discharging section (although not shown in FIGS. 2A through 2C, referred to as a section C) in which the voltage charged in the battery is completely discharged since a portable electronic product is not used for a long time.

To solve the above problem, a first detection unit 242 of the wireless power transmission system 1 detects current by using the power transmitted by the transmission unit 120, and a second detection unit 244 thereof detects a voltage status of the battery.

The reception control unit 260 combines results of the detection by the first and second detection units 242 and 244 and generates a code.

The reception communication unit 280 transfers the code generated by the reception control unit 260 to the transmission communication unit 140. The transmission communication unit 140 transfers the code to the transmission control unit 160 to control an amount of the power transmitted by the transmission unit 120.

The transmission control unit 260 transfers the results of the detection by the first and second detection units 242 and 244 to the transmission communication unit 140 through the reception communication unit 280. The transmission control unit 160 detects the charging voltage of the battery 300 and determines the charging status thereof by using the results of the detection by the first and second detection units 242 and 244.

The transmission control unit 160 determines whether the charging status of the battery 300 is present in a native damage region (NDR) section (that is a damage section due to reflective power by uniting the sections A, B, and C), and, if the charging status of the battery 300 is present in the NDR section, controls the transmission unit 120 to transmit power lower than the power of a normal operation.

That is, the transmission control unit 160 may set a region value of the sections A, B, and C that is the NDR section and performs soft charging that transmits the power lower than the power of the normal operation within a range of the set region value, thereby reducing an influence of a reflective wave that occurs in the NDR section. The transmission control unit 160 controls the transmission unit 120 to transmit the power of the normal operation in a section other than the NDR section.

Table 1 below is an example showing range values of reference voltages and soft charging voltages of the NOR section including the sections A, B, and C (an exemplary battery specification: Nominal Capacity=1,000 mAh, Charging voltage=4.1 V, and Charging Method=CC-CV).

TABLE 1

| Sections  | Reference Voltages | Soft Charging Sections |
|-----------|--------------------|------------------------|
| Section A | 2.7 V              | 2.619 V~2.781 V        |
| Section B | 3.3 V              | 3.201 V~3.399 V        |
| Section C | 4.0 V              | 3.880 V or higher      |

In this regard, the reference voltages of the sections A, B, and C are 2.7 V, 3.3 V, and 4.0 V, respectively, and the soft charging sections thereof are set as a range of ±3%. The reference voltages and the soft charging sections may vary according to capacity of a battery applied to a wireless power transmission system and characteristics of a battery pack.

As described above, in a section where the charging voltage of the battery 300 falls within a predetermined voltage range in the reference voltages of the sections A, B, and C, soft charging is performed to transmit the power lower than the power of the normal operation.

FIG. 3 is a flowchart of a method of controlling a wireless power transmission system according to an exemplary embodiment of the present invention.

Referring to FIG. 3, the first detection unit 242 of the reception device 200 detects current by using power transmitted by the transmission unit 120, and the second detection unit 244 thereof detects a voltage status of a battery and transmits a result of detection to the transmission device 100 (S300).

Next, the transmission control unit 160 of the transmission device 100 determines whether a charging status of the battery is present in an NDR section (S310), and, if the charging status of the battery is in the NDR section (yes in S310), controls the transmission unit 120 to transmit power lower than power of a normal operation (S320).

If the charging status of the battery is not in the NDR section (no in S310), the transmission control unit 160 controls the transmission unit 120 to transmit the power of the normal operation (S330).

Next, the transmission control unit 160 determines whether the battery is completely charged (S340), if the battery is completely charged (yes in S340), ends charging the battery, and, if the battery is not completely charged (no in S340), goes back to S310 to repeat the above process until the battery is completely charged.

As described above, the wireless power transmission system and a method of controlling the wireless power transmission system according to the exemplary embodiment of the present invention determine whether a charging status of a battery is present in an NDR section when the battery is charged, and, if the charging status of the battery is present in the NDR section, control a transmission device to transmit power lower than power of a normal operation, thereby advantageously minimizing damage of the transmission and reception devices due to a reflective wave.

In addition, damage of the wireless power transmission system is prevented in advance, thereby advantageously enhancing stability and reliability thereof.

Although the present invention has been shown and described with the exemplary embodiment as described above, the present invention is not limited to the exemplary embodiment as described above, but may be variously changed and modified by those skilled in the art to which the present invention pertains without departing from the scope of the present invention.

What is claimed is:

1. A wireless power transmission apparatus, comprising:
    a transmission communication unit receiving a code including a charging status of a battery;
    a transmission unit generating and transmitting power for charging the battery;
    a transmission control unit detecting the charging status of the battery by using the transmitted power, and, if the charging status of the battery is in a damage section due to reflective power, controlling the transmission unit to transmit power lower than power of a normal operation, and if the charging status of the battery is not in the damage section due to the reflective power, controlling the transmission unit to transmit the power of the normal operation,
    wherein the damage section due to the reflective power is a section in which a constant current (CC) mode in which the battery is charged constant current is converted into a constant voltage (CV) mode in which the battery is charged with constant voltage.

2. The wireless power transmission system according to claim 1, wherein the transmission control unit detects a charging voltage of the battery by using the transmitted power, and, if the charging voltage of the battery corresponds to a voltage range of the damage section due to the reflective power, controls the transmission unit to transmit power lower than the power of the normal operation.

3. The wireless power transmission system according to claim 1, wherein the transmission control unit determines a range of the transmitted code information, and, if the range of the transmitted code information corresponds to the voltage range of the damage section due to the reflective power, controls the transmission unit to transmit power lower than the power of the normal operation.

4. The wireless power transmission system according to claim 1, wherein the damage section due to the reflective power is a section in which the voltage charged in the battery is completely discharged.

5. The wireless power transmission system according to claim 1, wherein the damage section due to the reflective power is an initial charging section of the battery.

6. The wireless power transmission system according to claim 2, wherein the transmission unit includes:
    a power generator generating and transmitting the power for charging the battery; and
    a transmitter transmitting the transmitted power to the reception unit.

7. A method of controlling a wireless power transmission system, the method comprising:
    generating and transmitting power for charging a battery in a power transmission unit;
    receiving a code including a charging status of the battery in the power transmission unit;
    detecting a charging status of the battery by using the transmitted code in the power transmission unit;
    if the charging status of the battery is in a damage section due to reflective power, controlling power lower than power of a normal operation to be transmitted, and if the charging status of the battery is not in the damage section due to the reflective power, controlling the power transmission unit to transmit the power of the normal operation in the power transmission unit,
    wherein the damage section due to the reflective power is a section in which a constant current (CC) mode in which the battery is charged with constant current is converted into a constant voltage (CV) mode in which the battery charged with constant voltage.

8. The method according to claim 7, wherein the detecting and the controlling are repeatedly performed until the battery is completely charged.

9. The method according to claim 7, wherein the detecting includes detecting a charging voltage of the battery by using the transmitted power,
    wherein the controlling includes, if the charging voltage of the battery is in the damage section due to the reflective power, controlling power lower than the power of the normal operation to be transmitted.

10. The method according to claim 7, wherein the detecting includes:
    detecting current by using the transmitted power;
    detecting a voltage status of the battery;
    combining the detected current and the detected voltage status of the battery, generating code information, and detecting the charging status of the battery.

11. The method according to claim 7, wherein the damage section due to the reflective power is a section in which the voltage charged in the battery is completely discharged.

12. The method according to claim 7, wherein the damage section due to the reflective power is an initial charging section of the battery.

* * * * *